United States Patent
Noel et al.

(10) Patent No.: US 8,339,956 B2
(45) Date of Patent: Dec. 25, 2012

(54) METHOD AND APPARATUS FOR PROVIDING A CENTRALIZED SUBSCRIBER LOAD DISTRIBUTION

(75) Inventors: Eric Noel, Holmdel, NJ (US); Mark Ratcliffe, Oakhurst, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 563 days.

(21) Appl. No.: 12/014,489

(22) Filed: Jan. 15, 2008

(65) Prior Publication Data

US 2009/0180378 A1    Jul. 16, 2009

(51) Int. Cl.
*H04L 12/26* (2006.01)

(52) U.S. Cl. ............ 370/232; 370/231; 370/235

(58) Field of Classification Search .......... 370/231–235, 370/237–238, 252–253, 398, 395.2–395.21; 709/104–105, 223–229
See application file for complete search history.

(56) References Cited

U.S. PATENT DOCUMENTS

| | | | |
|---|---|---|---|
| 5,282,202 A | 1/1994 | Bernstein et al. | |
| 2004/0260831 A1* | 12/2004 | Dyck et al. | 709/233 |
| 2006/0195616 A1* | 8/2006 | Petersen | 709/250 |
| 2007/0195700 A1 | 8/2007 | Katoh et al. | |
| 2008/0162637 A1* | 7/2008 | Adamczyk et al. | 709/204 |
| 2008/0181161 A1 | 7/2008 | Gi Kim et al. | |
| 2009/0019535 A1* | 1/2009 | Mishra et al. | 726/12 |
| 2009/0106571 A1* | 4/2009 | Low et al. | 713/310 |
| 2009/0180381 A1* | 7/2009 | Noel et al. | 370/233 |

* cited by examiner

*Primary Examiner* — Thai Hoang

(57) ABSTRACT

A method and apparatus for providing subscriber load distribution in networks are disclosed. For example, the method receives capacity data and user equipment (UE) resource consumption data from a plurality of devices that process call control signaling messages within the communication network. The method receives a first request from one of the plurality of devices to re-register one or more selected user equipment, and selects at least one available device from the plurality of devices. The method then re-registers the one or more selected user equipment on the at least one available device.

20 Claims, 5 Drawing Sheets

METHOD AND APPARATUS FOR PROVIDING A CENTRALIZED SUBSCRIBER LOAD DISTRIBUTION

The present invention relates generally to communication networks and, more particularly, to a method and apparatus for providing subscriber load distribution from a centralized location in networks, e.g., packet networks, Internet Protocol (IP) networks, Voice over Internet Protocol (VoIP) networks, IP Multimedia Subsystem (IMS) networks, Virtual Private Networks (VPN), etc.

BACKGROUND OF THE INVENTION

When a customer wishes to access a network service, e.g., a Voice over Internet Protocol (VoIP) service, the customer's User Equipment (UE) is registered with a host server, e.g., a server with a Serving-Call Session Control Function (S-CSCF). Current methods distribute UEs across multiple servers with an S-CSCF function at registration time with no regard to the offered load. A UE may be re-registered on another S-CSCF server only under an exceptional condition, such as a network element failure. As such, call volumes may not be balanced across multiple S-CSCF servers.

SUMMARY OF THE INVENTION

In one embodiment, the present invention discloses a method and apparatus for providing subscriber load distribution from a centralized location within a network. For example, the method receives capacity data and user equipment (UE) resource consumption data from a plurality of devices that process call control signaling messages within the communication network. The method receives a first request from one of the plurality of devices to re-register one or more selected user equipment, and selects at least one available device from the plurality of devices. The method then re-registers the one or more selected user equipment on the at least one available device.

In one alternate embodiment, the method measures a resource capacity of a device that processes call control signaling messages within the communication network, and measures a peak period volume for each of a plurality of registered user equipment that is registered with the device. The method determines whether a peak period volume of the device exceeds or reaches an on-set threshold of the device. The method selects one or more of the plurality of registered user equipment if the on-set threshold of the device is reached or exceeded, where a sum of the peak period volumes of the selected one or more plurality of registered user equipment is larger than or equal to a volume of traffic that is in excess of the on-set threshold, or in excess of an off-set threshold of said device. The method sends a request for the selected one or more plurality of registered user equipment to be re-registered to another device.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing centralized subscriber load distribution within a network. Although the present invention is discussed below in the context of packet networks, e.g., Internet Protocol (IP) networks, the present invention is not so limited. Namely, the present invention can be applied to other packet networks and the like.

Figure 1:
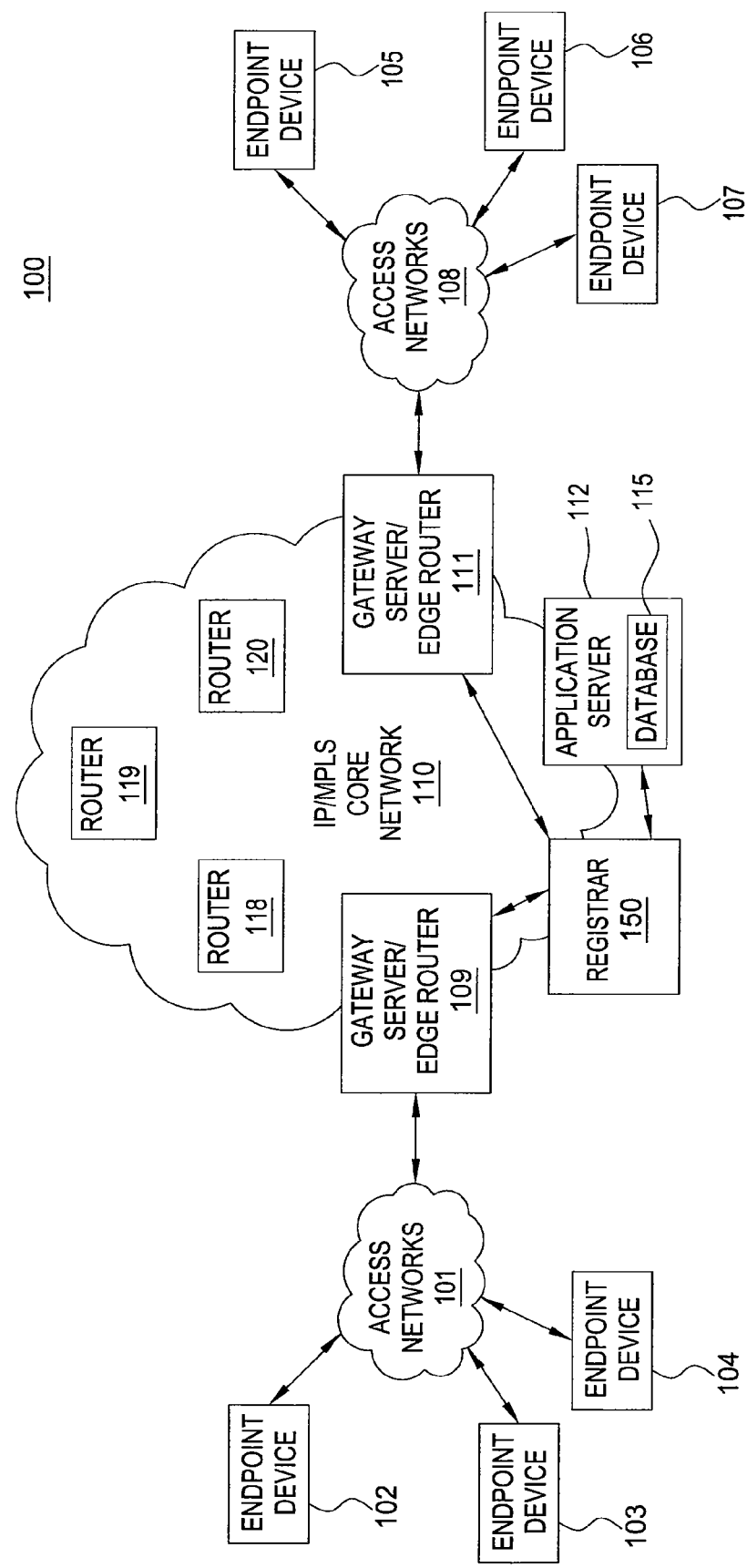
FIG. 1 illustrates an exemplary network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements 109 and 111 may serve as gateway servers or edge routers for the network 110.

In one embodiment, a registrar 150 is illustrated in network 110. The registrar 150 broadly encompasses a Serving-Call Session Control Function (S-CSCF), e.g., as implemented on a server. It should be noted that a plurality of registrars (not shown) can be deployed in the network 110. In operation, a user endpoint will be registered to one registrar among a plurality of registrars within network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a 3$^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five routers, one registrar and so on are depicted in FIG. 1, the communication system 100 may be expanded by including additional endpoint devices, access networks, border elements, routers, registrars, etc. without altering the present invention.

The above IP network is described to provide an illustrative environment in which packets for voice and data services are transmitted on networks. When a UE registers with a registrar, e.g., a Serving-Call Session Control Function (S-CSCF), the amount of load to be produced by the UE is often unknown. The registration is performed independent of the load that will be produced. As such, call volumes may not be balanced across multiple S-CSCF functions and may contribute to S-CSCF overload. When an S-CSCF is overloaded, calls are dropped, thereby resulting in customer dissatisfaction with the subscribed service and loss of revenue for the service provider.

For example, a UE may be an Internet Protocol—Private Branch Exchange (IP-PBX) servicing a call center that handles calls terminating to a toll-free number. The capacity of the server providing the S-CSCF function to the UE may limit the throughput of the UE. As a result, the IP-PBX servicing the toll-free number may have a capacity need that cannot be sufficiently met by the S-CSCF server with whom the IP-PBX has registered with during an initial registration process.

In one embodiment, the current method provides a centralized load distribution method or algorithm that enables a load managing server, e.g., a Home Subscriber Server (HSS), to periodically redistribute registered UEs to different S-CSCFs. To better understand the current invention, the following networking terminology will first be provided:

a) Home Subscriber Server (HSS); and
b) Serving-Call Session Control Function (S-CSCF).

Home Subscriber Server (HSS) refers to a server with a database for storing user data, e.g., registration status, the S-CSCF that serves the user, the service profile associated with the user, etc., required by a core network to fulfill its duties. The HSS also performs authentication and authorization of the user and may provide information about the location of the user.

Serving-Call Session Control Function (S-CSCF) is the central node of the signaling plane for performing session control and the SIP registrar function binding the UE to the S-CSCF. Broadly defined, an S-CSCF processes call control signaling messages. In one embodiment, it can be implemented as a registrar or a Session Initiation Protocol (SIP) server. For example, the S-CSCF is located in the network and interfaces with the HSS to download and upload user profiles. In one embodiment, the S-CSCF has no local storage of the user data. All necessary information is loaded from the HSS. The S-CSCF sits on the path of all signaling messages, and can inspect every message to decide to which application server(s), if applicable, and to which next server a SIP message is to be forwarded.

Figure 2:
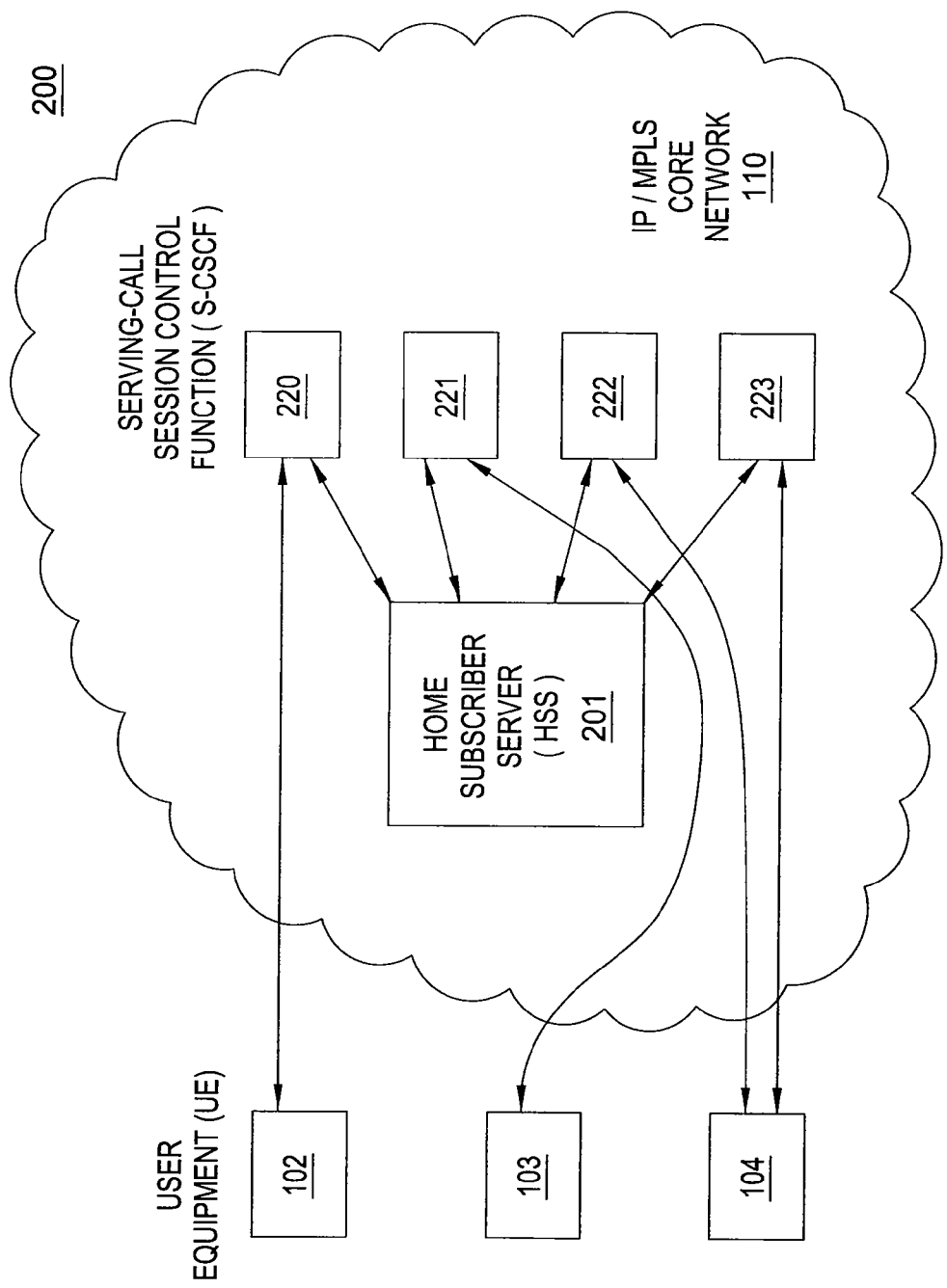
FIG. 2 illustrates an exemplary network with the current invention for providing subscriber load distribution.

FIG. 2 illustrates an exemplary network 200 of the current invention for providing centralized subscriber load distribution. User Equipment (UEs) 102-104 are accessing services from IP/MPLS core network 110. The UEs are in communication with a load managing server, e.g., a HSS 201 via a plurality of S-CSCFs 220-223 for registering and accessing services. The HSS 201 selects one of the S-CSCFs 220-223 for each UE and enables the UEs to register with one of the assigned S-CSCFs 220-223. For example, UE 102 may be registered on S-CSCF 220, while UE 103 is registered on S-CSCF 221 and so on. Furthermore, each UE (e.g., UE 104) may have the capability to communicate with more than one S-CSCF. Again, it should be noted that the number of UEs, S-CSCFs, and HSS shown in FIG. 2 is only illustrative and should not be interpreted as a limitation of the present invention.

In one embodiment, the current invention enables each S-CSCF server to periodically measure its own S-CSCF resource capacity. The S-CSCF also measures resource consumption for each registered UE. For example, an S-CSCF may measure a peak period volume for each registered UE. For example, an S-CSCF server may determine the peak volume for each registered UE on an hourly basis. It should be noted that the peak volume can be measured in accordance with other predefined time periods based on the requirements of a particular implementation.

The S-CSCF then reports its own S-CSCF resource capacity and optionally each registered UE's resource consumption, e.g., peak period volumes, to the HSS. The HSS may then track the availabilities and the peak period volumes (described below) of the S-CSCF servers. For example, the HSS may receive the resource capacity and optionally UE's resource consumption data from each S-CSCF on an hourly basis. Thus, the HSS is provided with the capability to track each S-CSCF's capacity and peak period volume over time.

In one embodiment, the service provider determines the peak period length for tracking the capacity of S-CSCF servers and/or tracking of the resource consumption by the UEs. The appropriate period of time depends upon the type of service. For example, for uniform services with Poisson centralized arrivals, 1-hour may be used. For services with bursty arrivals, a shorter period of time such as 5 minutes may be needed. For example, teleconferencing services may be grouped at fixed time periods and may have arrival times that are bursty.

In one embodiment, the S-CSCF is able to detect when its peak period volume is exceeded in accordance with a predefined threshold. An S-CSCF may have one or more thresholds for triggering load re-distribution, e.g., an on-set threshold, an off-set threshold, an overload threshold, a maximum capacity threshold, etc.

In one embodiment, the maximum capacity refers to an S-CSCF's capacity beyond which the S-CSCF will no longer be able to process an additional transaction, and in fact, may start a maximum capacity method or algorithm, e.g., selectively dropping packets, dropping set-up messages, and the like. An overload threshold for an S-CSCF refers to a threshold that is set to activate an overload method or algorithm so as to prevent the S-CSCF from reaching or exceeding its maximum capacity. For example, the overload method may activate various remedial steps, e.g., triggering a warning message to a customer or to the service provider, requesting additional resources, requesting re-direction of traffic, and the like.

In one embodiment, an on-set threshold for an S-CSCF refers to a threshold used to decide when a load balancing method or algorithm is to be invoked. In contrast, an S-CSCF also has an off-set threshold used to terminate a redistribution of load process, i.e., to terminate the load balancing algorithm. The use of the on-set threshold in conjunction with the off-set threshold will reduce oscillations where UEs are constantly being re-registered with different S-CSCFs. For example, the on-set threshold is set to a larger value than the off-set threshold, but both thresholds are set below the overload threshold. As such, when a load balancing method is triggered after exceeding the on-set threshold, the load balancing method will continue to be in effect until the off-set threshold is reached. Namely, the load balancing method will not terminate when the measured traffic volume falls below the on-set threshold. Thus, the load balancing method will be triggered before the overload threshold of the S-CSCF is reached.

It should be noted that the various thresholds can be set based upon a percentage of the maximum capacity of an S-CSCF. For example, an overload threshold can be set at 90% of the maximum capacity. Similarly, an on-set threshold can be set at 80% of the maximum capacity and an off-set threshold can be set at 70% of the maximum capacity. It should be noted that the values set for these various thresholds can be selectively set by a service provider depending on the requirements of a particular application or through the collection of statistics over a period of time.

In one embodiment, a particular S-CSCF may have detected that a peak period volume may have exceeded its on-set threshold. As part of the load balancing method, the S-CSCF may select one or more UEs whose cumulative peak period volume is larger than or equal to the volume of traffic in excess of the on-set threshold. It should be noted that for some network scenarios, selecting candidate UEs for a move to other S-CSCFs based on consumption may not be practical. For example, a UE for a customer may be selected repeatedly for re-registration to other S-CSCFs. In one embodiment, the frequency of moving the same UEs from one S-CSCF to another may be reduced by using a random selection mechanism. For example, the current method may use a random selection algorithm to select candidate UEs for load redistribution.

For example, the method may randomly select a list of candidate UEs that has been reported by an S-CSCF. The method may then sum the peak period volumes of the selected UEs. If the sum of the peak period volumes of the selected UEs is less than the volume of traffic in excess of the on-set threshold (or alternatively the off-set threshold), then the method adds more candidate UEs. The process continues until the sum is greater than or equal to the traffic in excess of the on-set threshold (or alternatively the off-set threshold).

Then, the S-CSCF sends the list of the one of more randomly selected UEs and their respective resource consumption to the HSS. For example, the list may contain randomly selected UEs, where the de-registration of one or more of the listed UEs would result in the S-CSCF's peak period volume falling below its on-set threshold.

For each selected UE, the HSS then selects an available S-CSCF whose peak period volume plus that of the UE is less than or below the off-set threshold volume for said S-CSCF. For example, for each selected registered UE, the method may randomly identify a new S-CSCF among S-CSCFs whose off-set threshold would not be exceeded after registering this new UE. For example, there may be 10 S-CSCFs with available capacity but there may be only one S-CSCF that will not exceed its off-set threshold after registering the selected UE. Then, the HSS will choose the only S-CSCF that meets the criteria of not having its off-set threshold exceeded.

Alternatively, the HSS may select an available S-CSCF whose peak period volume plus that of the UE is less than or below the on-set threshold volume for the S-CSCF instead of the off-set threshold volume for the S-CSCF. Namely, if the number of available S-CSCFs is limited, then using the off-set threshold may be too stringent. In another embodiment, a 2 phase approach can be implemented, e.g., first selecting an S-CSCF such that the cumulative peak volume plus that of the UE is less than or below the off-set threshold of the selected S-CSCF, but if such S-CSCF is not found, then selecting an S-CSCF such that the cumulative peak volume plus that of the UE is less than or below the on-set threshold.

The HSS then re-registers or causes each of the selected one or more UEs to be re-registered to the selected S-CSCF. Those skilled in the art will realize that the re-registering process of the selected UE onto a new S-CSCF implies a de-registration process from the previous S-CSCF has occurred.

In one embodiment, the HSS re-registers a UE when the session is idle. For example, the HSS waits until the termination of the established sessions before performing de-registration of the UE with the current S-CSCF and re-registration with the new S-CSCF. In one embodiment, the HSS subscribes to the S-CSCF to be notified when the UE is idle. For example, if an HSS receives a request from a first S-CSCF to move a randomly selected UE to another S-CSCF, then the HSS will subscribe with the first S-CSCF to be notified when the selected UE is idle. The HSS is then able to determine when the UE has no active sessions and to perform the re-registration without any service impact to the selected UE.

Alternatively, the HSS may re-register a UE only after a pre-provisioned period of time, e.g., based on average call hold time of the UE as monitored by the S-CSCF, based on the time of day, based on a predefined period of time, and so on.

In one alternate embodiment, re-registration may occur immediately regardless of whether or not there are one or more active sessions. For example, the reported volume for the UE is such that re-registration should be performed immediately to minimize service impact to that particular customer and/or to other customers serviced by the same S-CSCF.

In one embodiment, the network service provider selectively determines when the re-registration is allowed, e.g., upon termination of active calls, immediately or after a predetermined time elapses. This allows the service provider the flexible control in dictating when and how re-registration will be implemented.

In one embodiment, the capacity data is sent to an HSS using a standard information exchange protocol, e.g., using a Diameter Watchdog Request (DWR) message. Thus, the present invention can be implemented using an existing communication protocol.

Figure 3:
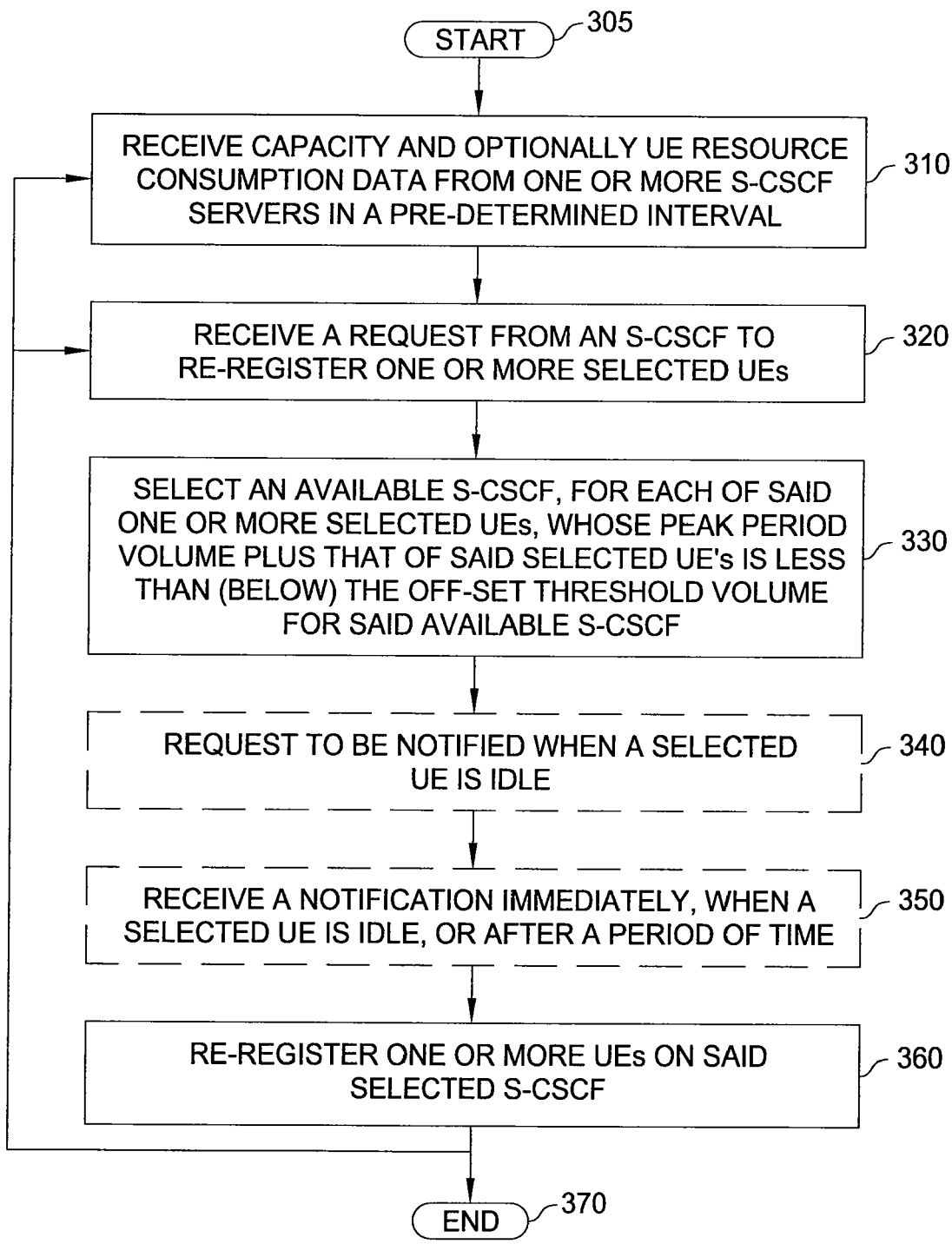
FIG. 3 illustrates a flowchart of a method for providing a subscriber load distribution.

FIG. 3 illustrates a flowchart of a method 300 for providing a subscriber load distribution. For example, method 300 can be implemented by a Home Subscriber Server (HSS). Method 300 starts in step 305 and proceeds to step 310.

In step 310, a Home Subscriber Server (HSS) receives capacity and optionally UE resource consumption data from one or more S-CSCF servers in a pre-determined interval. For example, an HSS gathers peak period volumes and each registered UE's consumption data from a plurality of S-CSCF servers, e.g., on an hourly basis.

In step 320, method 300 receives a request from an S-CSCF to re-register one or more selected UEs. The said request includes the selected UEs respective resource consumption. For example, a first S-CSCF server sends a request to the HSS to move a randomly selected list of UEs, e.g., to other S-CSCF servers such that its own peak period volume will return below its on-set threshold (or alternatively the off-set threshold).

In step 330, method 300, the HSS, selects an available S-CSCF, for each of the one or more selected UEs, whose peak period volume plus that of the selected UE's is less than (e.g., below) the off-set threshold volume for the available S-CSCF. For example, for each of said selected registered UE, the method may randomly identify a new S-CSCF among available S-CSCFs whose off-set threshold would not be exceeded after registering the selected UE. Alternatively, the HSS, may select an available S-CSCF, for each of the one or more selected UEs, whose peak period volume plus that of the selected UE's is less than (e.g., below) the on-set threshold volume for the available S-CSCF.

In optional step 340, method 300 may request to be notified when a selected UE is idle. For example, the HSS may have received a request from an S-CSCF to re-register a first UE. However, the UE may have one or more active sessions. The HSS may then send a request to the current S-CSCF to be notified when the first UE is idle.

In optional step 350, method 300 may receive a notification immediately, when a selected UE is idle, or after a preselected time period as discussed above. For example, the method may receive a response to the request sent in step 340.

In step 360, method 300 re-registers one or more of the selected UEs on the selected S-CSCF. It should be noted that more than one available S-CSCF can be used to accept the re-registration of the selected UEs. The method then proceeds to step 370 to end processing the current request or returns to step 310 and/or step 320.

Figure 4:
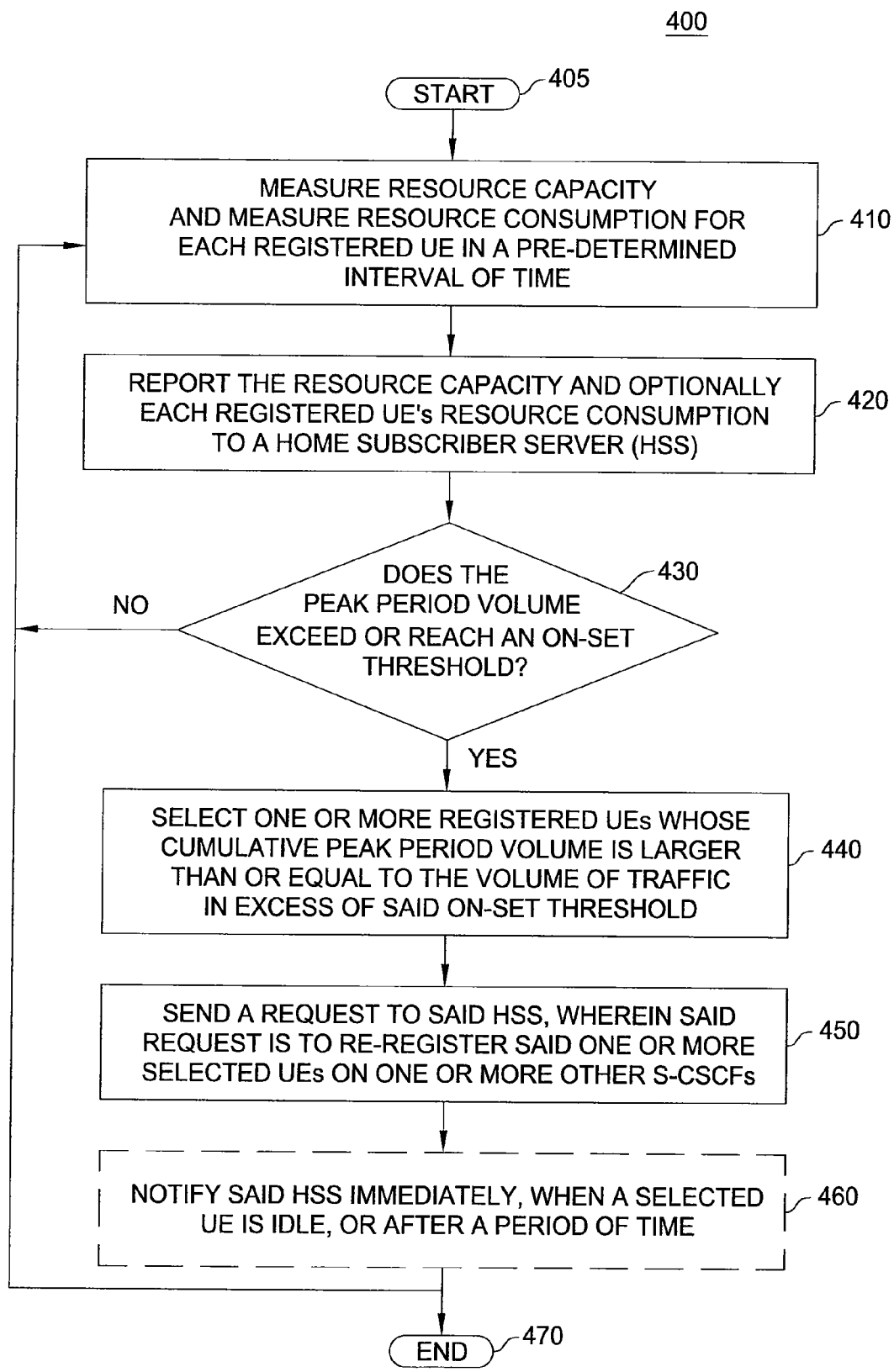
FIG. 4 illustrates a flowchart of a method for providing a subscriber load distribution.

FIG. 4 illustrates a flowchart of a method 400 for providing a subscriber load distribution. For example, method 400 can be implemented by an S-CSCF server. Method 400 starts in step 405 and proceeds to step 410.

In step 410, method 400 measures resource capacity of an S-CSCF and measures resource consumption for each registered UE supported by the S-CSCF in a pre-determined interval of time. For example, an S-CSCF measures a peak period volume for each registered UE that it services and its overall peak period volume for a particular interval of time.

In step 420, method 400 reports the S-CSCF resource capacity and optionally each registered UE's resource consumption to a Home Subscriber Server (HSS). For example, the method may report the measured information to the HSS on an hourly basis.

In step 430, method 400 determines whether or not the peak period volume exceeds or reaches an on-set threshold. For example, each S-CSCF server is provided with an on-set threshold. If the on-set threshold is reached or exceeded, then the method proceeds to step 440. Otherwise, the method proceeds to step 410.

In step 440, method 400 selects one or more registered UEs whose cumulative peak period volume is larger than or equal to the volume of traffic in excess of the on-set threshold. For example, the method may randomly select a list of candidate UEs. The method may then sum the peak period volumes of the selected UEs. If the sum of the peak period volumes of selected UEs is less than the volume of traffic in excess of the on-set threshold, then the method adds more candidate UEs. The process continues until the sum is greater than or equal to the traffic in excess of the on-set threshold.

Alternatively, in step 440, method 400 may select one or more registered UEs whose cumulative peak period volume is larger than or equal to the volume of traffic in excess of the off-set threshold. This will likely redirect more UEs from the current overloaded S-CSCF, thereby reducing the need of having to redirect additional UEs from the current S-CSCF.

It should be noted that various alternative UE selection methods can also be employed. For example, one alternative method may rank order the UEs based on their peak period volume and then selecting the xth highest UEs such that the cumulative peak period is equal to or larger than the excess traffic. Another alternative method may rank order the UEs based on historical trending of UE resource consumption and then selecting the xth highest UEs such that the cumulative peak period is equal to or larger than the excess traffic, etc.

In step 450, method 400 sends a request to the HSS, wherein the request is to re-register the one of more selected UEs on one or more other S-CSCFs. For example, the method sends a request to move a selected list of registered UEs and each registered UE's resource consumption to other devices or servers providing the S-CSCF functionality.

In optional step 460, method 400 may notify the HSS immediately, when a selected UE is idle, or after a preselected time period as discussed above. For example, the method may have requested to move a first UE to another S-CSCF. However, the UE may have had one or more active sessions while the request was sent. In response, the HSS may have requested to be notified when the UE has no active sessions, i.e., when the UE is idle. Method 400 then ends in step 470 or returns to step 410.

It should be noted that although not specifically specified, one or more steps of methods 300 and 400 may include a storing, displaying and/or outputting step as required for a particular application. In other words, any data, records, fields, and/or intermediate results discussed in the methods 300 and 400 can be stored, displayed and/or outputted to another device as required for a particular application. Furthermore, steps or blocks in FIG. 3 or FIG. 4 that recite a determining operation, or involve a decision, do not necessarily require that both branches of the determining operation be practiced. In other words, one of the branches of the determining operation can be deemed as an optional step.

Figure 5:
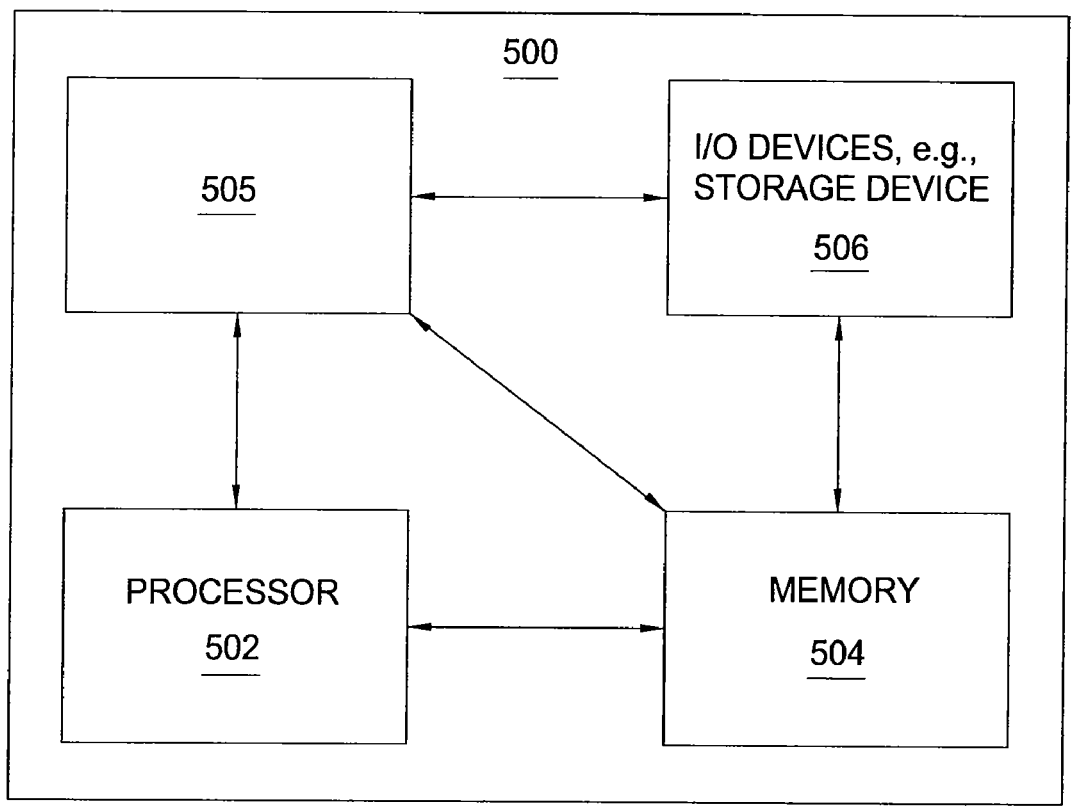
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing centralized subscriber load distribution (e.g., implementing method 300 or method 400 as discussed above), and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing centralized subscriber load distribution can be loaded into memory 504 and executed by processor 502 to implement the functions as discussed above. As such, the present method 505 for providing centralized subscriber load distribution (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a subscriber load distribution in a communication network, comprising:

receiving capacity data and user equipment resource consumption data from a plurality of devices that process call control signaling messages within the communication network;

receiving a first request from one of the plurality of devices to re-register a selected user equipment that was previously registered with the one of the plurality of devices;

selecting an available device from the plurality of devices; and re-registering the selected user equipment on the available device.

2. The method of claim 1, wherein the available device is selected only if a peak period volume of the available device plus a peak period volume of the selected user equipment is less than an off-set threshold of the available device.

3. The method of claim 2, wherein each of the plurality of devices performs a serving-call session control function.

4. The method of claim 1, further comprising:
sending a second request for a notification to the one of the plurality of devices that sent the first request, where the notification indicates when the selected user equipment is idle.

5. The method of claim 4, further comprising:
receiving the notification from the one of the plurality of devices that sent the first request when the selected user equipment is idle.

6. The method of claim 1, wherein the selected user equipment is re-registered after all established sessions on the selected user equipment are terminated.

7. The method of claim 1, wherein the selected user equipment is re-registered immediately after the available device is selected.

8. The method of claim 1, wherein the selected user equipment is re-registered after a preselected time period.

9. A non-transitory computer-readable medium having stored thereon a plurality of instructions, the plurality of instructions including instructions which, when executed by a processor, cause the processor to perform a method for providing a subscriber load distribution in a communication network, comprising:
receiving capacity data and user equipment resource consumption data from a plurality of devices that process call control signaling messages within the communication network;
receiving a first request from one of the plurality of devices to re-register a selected user equipment that was previously registered with the one of the plurality of devices;
selecting an available device from the plurality of devices; and
re-registering the selected user equipment on the available device.

10. The non-transitory computer-readable medium of claim 9, wherein the available device is selected only if a peak period volume of the available device plus a peak period volume of the selected user equipment is less than an off-set threshold of the available device.

11. The non-transitory computer-readable medium of claim 10, wherein each of the plurality of devices performs a serving-call session control function.

12. The non-transitory computer-readable medium of claim 9, further comprising:
sending a second request for a notification to the one of the plurality of devices that sent the first request, where the notification indicates when the selected user equipment is idle.

13. The non-transitory computer-readable medium of claim 12, further comprising:
receiving the notification from the one of the plurality of devices that sent the first request when the selected user equipment is idle.

14. The non-transitory computer-readable medium of claim 9, wherein the selected user equipment is re-registered after all established sessions on the selected user equipment are terminated.

15. The non-transitory computer-readable medium of claim 9, wherein the selected user equipment is re-registered after a preselected time period.

16. A method for providing a subscriber load distribution in a communication network, comprising:
measuring a resource capacity of a device that processes call control signaling messages within the communication network;
measuring a peak period volume for each of a plurality of registered user equipment that is registered with the device;
determining whether a peak period volume of the device reaches an on-set threshold of the device;
selecting a registered user equipment of the plurality of registered user equipment if the on-set threshold of the device is reached, where a sum of the peak period volumes of the selected registered user equipment of the plurality of registered user equipment is larger than or equal to a volume of traffic that is in excess of the on-set threshold; and
sending a request for the selected registered user equipment of the plurality of registered user equipment to be re-registered to another device.

17. The method of claim 16, further comprising:
reporting the resource capacity of the device to a home subscriber server.

18. The method of claim 17, wherein the request is sent to the home subscriber server.

19. The method of claim 17, further comprising:
notifying after a preselected time period, the home subscriber server when one of the plurality of registered user equipment is idle.

20. The method of claim 16, wherein the selecting the registered user equipment of the plurality of registered user equipment is performed in accordance with a random selection algorithm.

* * * * *